United States Patent [19]
Weinstein

[11] 3,932,763
[45] Jan. 13, 1976

[54] DETECTOR FOR TUBULAR TRANSPARENT ARTICLE

[75] Inventor: Harold Weinstein, Sherman Oaks, Calif.

[73] Assignee: Sensor Technology, Inc., Chatsworth, Calif.

[22] Filed: July 29, 1974

[21] Appl. No.: 492,483

[52] U.S. Cl. ............... 250/576; 250/216; 250/222; 250/223 B; 356/201; 356/209; 356/246
[51] Int. Cl. .................... G01n 21/24; G01n 1/10
[58] Field of Search ........... 250/573, 574, 575, 576, 250/215, 216, 222, 223 R, 223 B; 356/39, 356/180, 201, 209, 244, 246; 350/104

[56] References Cited
UNITED STATES PATENTS

| | | |
|---|---|---|
| 2,024,720 | 12/1935 | Cornell et al. .................... 250/576 |
| 3,265,901 | 8/1966 | Schneider .......................... 250/223 |
| 3,544,225 | 12/1970 | Wattenburg et al. ............... 356/201 |
| 3,787,703 | 1/1974 | Topol ................................. 250/574 |

*Primary Examiner*—James W. Lawrence
*Assistant Examiner*—E. R. La Roche
*Attorney, Agent, or Firm*—Flam & Flam

[57] ABSTRACT

A detector for tubular transparent articles employs a light beam directed across an opening in a housing, along a path offset from a diameter of that opening. When a tubular article is present in the opening, the light is glazingly deflected by a curved surface of the article, optimally at the critical angle of maximum light reflection. The resultant reduction in beam intensity is sensed by a photodetector to indicate the presence of the article.

9 Claims, 7 Drawing Figures

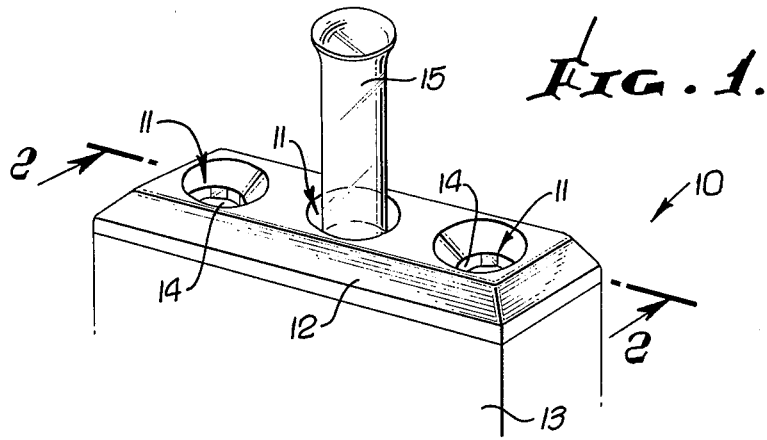
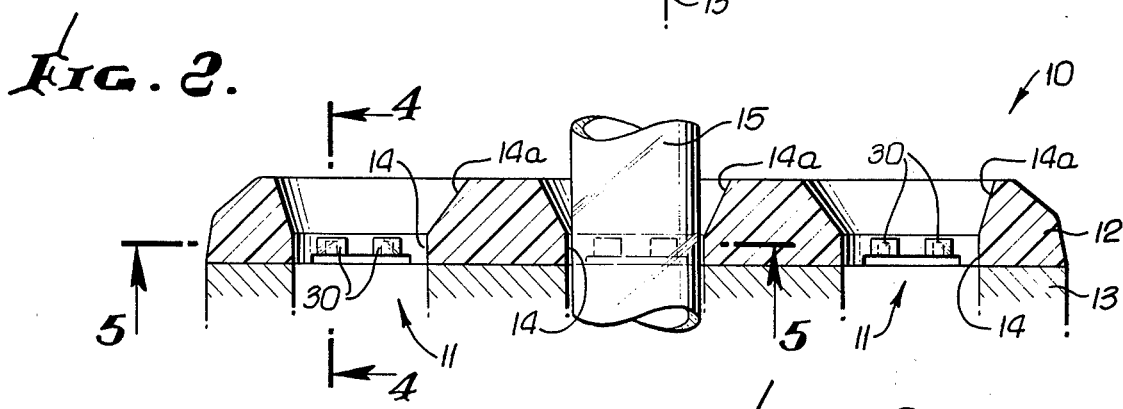
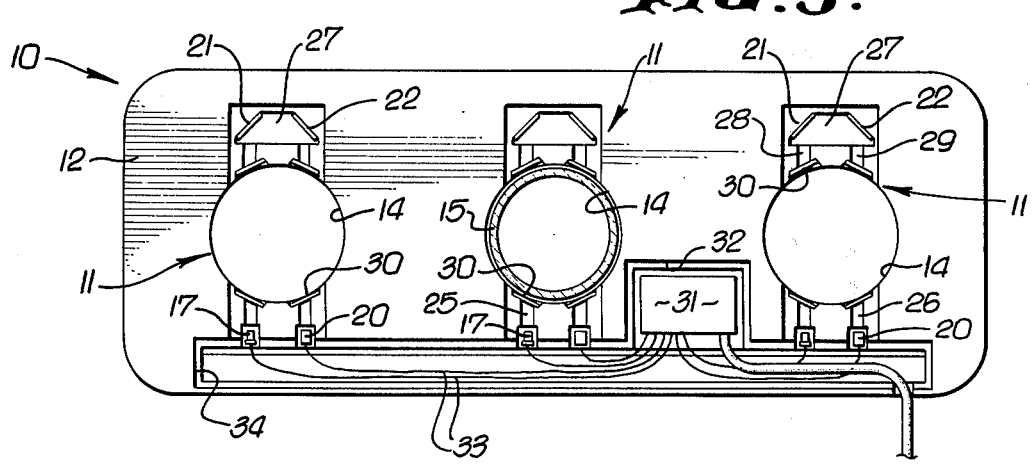
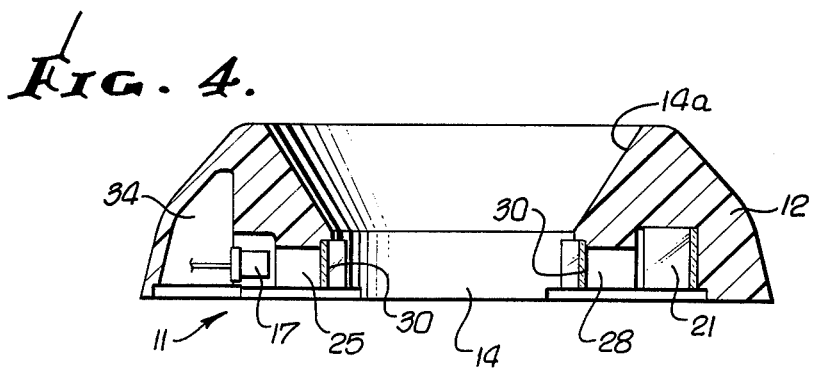

3,932,763

DETECTOR FOR TUBULAR TRANSPARENT ARTICLE

BACKGROUND OF THE INVENTION

1. Field of the Invention

The present invention relates to apparatus for detecting the presence of a transparent tubular article such as a test tube.

2. Description of the Prior Art

In automatic blood sample analysis systems, a test tube containing a blood sample that has been treated with radioisotopes is lowered into a nuclear detector that measures the radiation level. The test tube is handled by machine, to minimize the human exposure to radiation. Some indication must be provided to the system that a test tube has been lowered into place and that nuclear radiation detection should begin. An object of the present invention is to provide such an indicator.

Mechanical or electrical detectors are to be avoided as they may interfere with the isotope analysis. Magnetic detection cannot be used as the test tubes are non-ferrous. Optical detection is preferred, but is complicated because test tubes usually are made of highly transparent glass. Thus a beam of light sent directly through the test tube will not be attenuated sufficiently to permit reliable detection. Another object of the present invention is to provide an optical detector capable of sensing the presence of a highly transparent tubular article.

SUMMARY OF THE INVENTION

These objectives are achieved by providing an optical detector for tubular transparent articles that senses the reduction in intensity resultant from glazing deflection of a light beam by the curved article surface. In a preferred embodiment the detector uses a light emitting diode to project a beam across a circular opening in a housing. The beam is parallel to, but offset from, the transverse axis of the opening. When a test tube or like tubular article is present in the opening, the beam intersects a curved surface and is reflected or refracted therefrom, optimally at the critical angle of maximum reflection. As a result, the beam intensity reaching a photodetector is substantially reduced, resulting in positive detection of the transparent article.

BRIEF DESCRIPTION OF THE DRAWINGS

A detailed description of the invention will be made with reference to the accompanying drawings wherein like numerals designate corresponding elements in the several figures. These drawings, unless described as diagrammatic or unless otherwise indicated, are to scale.

FIG. 1 is a pictorial view of a preferred embodiment of the inventive apparatus for detecting the presence of a tubular transparent article.

FIG. 2 is a longitudinal sectional view of the apparatus of FIG. 1, as viewed along the line 2—2 thereof.

FIG. 3 is a bottom view of the apparatus of FIG. 1.

FIG. 4 is a transverse sectional view of the apparatus of FIG. 1, as seen along the line 4—4 of FIG. 2.

DESCRIPTION OF THE PREFERRED EMBODIMENTS

Figure 5:
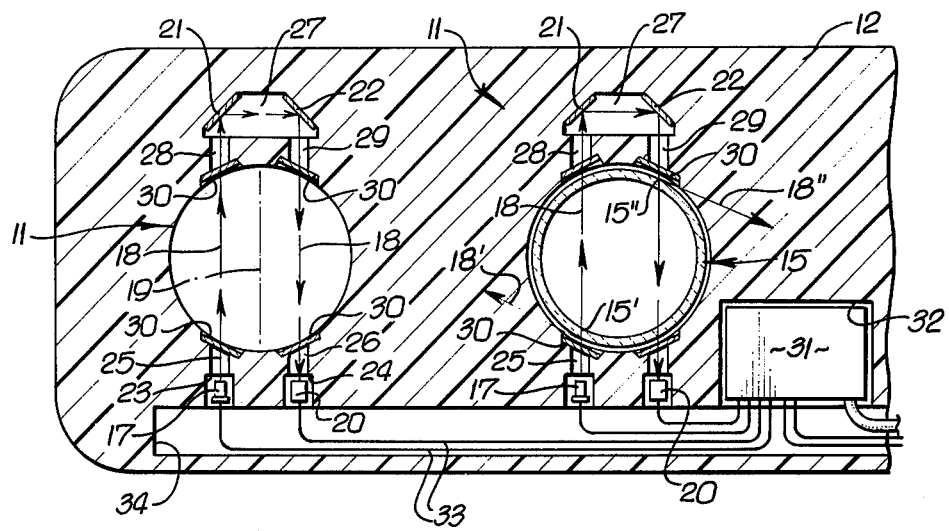
FIG. 5 is a sectional view of the apparatus of FIG. 1 as seen along the line 5—5 of FIG. 2, and indicating diagrammatically the operation of the invention.

The following detailed description is of the best presently contemplated modes of carrying out the invention. This description is not to be taken in a limiting sense, but is made merely for the purpose of illustrating the general principles of the invention since the scope of the invention best is defined by the appended claims.

Operational characteristics attributed to forms of the invention first described also shall be attributed to forms later described, unless such characteristics obviously are inapplicable or unless specific exception is made.

The apparatus 10 of FIGS. 1 – 5 contains three identical detectors 11 in accordance with the present invention. The detectors 11 are situated in a housing 12 that forms the top of a unit 13, for example, a blood analysis system. Each detector has an opening 14 through which a test tube 15 may be inserted into the unit 13. Preferably the opening 14 is circular and has a diameter just slightly larger than the test tube 15. This insures that the light beam of the detector 11 will strike the test tube 15 at an angle that will give optimum glazing deflection. A tapered section 14a guides the test tube 15 into the opening 14.

Each detector 11 uses a light emitting diode 17 to project a beam of light 18 (FIG. 5) across the opening 14. The path of the beam 18 is parallel to, but spaced from, the diameter or transverse axis 19 of the opening 14. Thus when a test tube 15 is present in the opening 14, a substantial portion of the beam 18 will be deflected by the curved surface of the test tube 15. This is illustrated in FIG. 5, where the arrow 18' indicates the direction of light that has been glazingly deflected by reflection and/or refraction from the curved surface of intersection 15'. The spacing between the light path 18 and the opening axis 19 is selected to optimize the percentage of light that is deflected by the test tube 15. Advantageously this distance is selected so that the light beam strikes the area 15' of intersection at the critical angle of total light reflection.

As a result of the glazing deflection of the light beam, the intensity of the residual light passing through the test tube 15 is substantially reduced. This intensity reduction is sensed by a photodetector 20, the reduced output signal level of which indicates the presence of a test tube 15 in the opening 14.

To optimize the difference in the intensity of light reaching the photodetector 20, the light path 18 advantageously traverses the opening 14 twice. To this end, there are provided a pair of mirrors 21, 22 (FIGS. 3 and 5) situated at 45° with respect to each other and to the path 18 from the light source 17. As a result, the beam 18 is reflected back along a path 18a across the opening 14. This path 18a also is parallel to, but spaced from the opening axis or transverse diameter 19. Again, this spacing is selected so that optimum defection occurs when the beam 18a intersects the test tube 15. This deflection, indicated by the arrow 18'' of FIG. 5, is optimized by situating the beam 18a so as to intersect the curved section 15'' of the test tube 15 at the critical angle.

The photodetector 20 is situated at the end of the light path 18a. With this arrangement, the output signal from the photodetector 20 will be relatively high when no test tube is present in the opening 14. However, when a test tube 15 is present in the opening 14, the very substantial light deflection at the intersections 15' and 15'' causes a very significant reduction in the amount of light striking the photodetector 20, with a concomitant reduction in output signal level. Error-free detection is obtained, even though the test tube 15 is made of highly transparent glass.

The housing 12 may be made of plastic colored black to optimize light absorption. The light emitting diode 17 and the photodetector 20 are mounted in corresponding recesses 23, 24 formed in the housing 14. Channels 25, 26 lead from these recesses to the opening 14, and serve in part to direct the light along the path 18. Similarly, the mirrors 21, 22 are mounted in a common recess 27 having channels 28, 29 leading to the opening 14 along the light path 18. Windows 30 of glass or transparent plastic cover each channel 25, 26, 28, 29 to prevent the entry of dust or dirt. Electronic circuitry 31, such as a power supply for the light emitting diodes 17 and amplifiers for the photodetectors 20, may be mounted in another recess 32 in the housing 12. Electrical connectors 33 to this circuitry 31 pass through an elongate recess 34.

Figure 6:
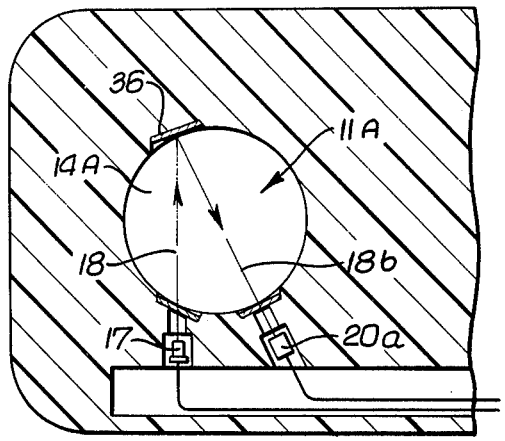
FIG. 6 is a fragmentary sectional view similar in aspect to FIG. 5, but showing another embodiment of the invention.

In the alternative embodiment of FIG. 6, the detector 11A employs a single mirror 36 to reflect the light beam 18 directly back along a path 18b to the photodetector 20a. When a test tube 15 is inserted in the opening 14A, the light beam 18 is glazingly deflected, as described above in conjunction with FIG. 5. However, the reflected light beam 18b passes through the test tube 15 approximately along a diameter, and hence is deflected only minimally if at all. However, the substantial deflection of the beam 18 still is sufficient to provide positive detection of the presence of a test tube within the opening 14A.

Figure 7:
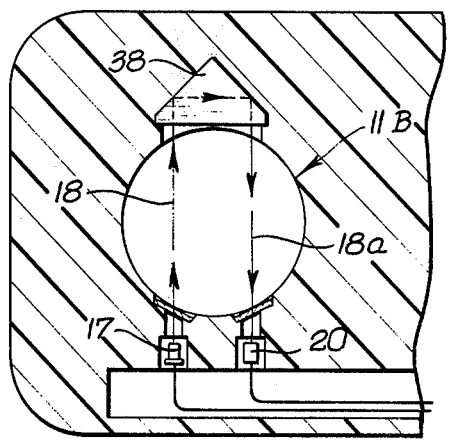
FIG. 7 is a fragmentary sectional view, similar in aspect to FIG. 5, showing an embodiment of the invention employing a porro prism.

In the embodiment of FIG. 7, the detector 11B functions identically to that described in connection with FIG. 5. However, the two mirrors 21, 22 have been replaced with a single porro prism 38. In such a prism, the 45°–45°–90° configuration results in substantially total internal reflection, so that the light beam 18 is reflected back along the desired path 18a.

In the foregoing description, the detected article is a test tube 15. Of course, the invention is not so limited, and the inventive detector 11 can be used to sense the presence of any transparent tubular or curved article.

Intending to claim all novel, useful and unobvious features shown or described, the applicant claims:

1. Apparatus for detecting the presence of a tubular transparent article in an opening through a housing, comprising;
light source means for projecting a light beam across said opening along a path offset from a transverse diameter of said opening, and
detector means, situated to receive said beam after it has traversed said opening, for detecting the intensity of said beam, said light beam being glazingly deflected by the curved surface of a tubular article in said opening, the resultant reduction in intensity detected by said detector means indicating the presence of said article in said opening.

2. Apparatus according to claim 1 wherein;
said light source means comprises a light emitting diode mounted in said housing, wherein
said detector means comprises a photodetector mounted in said housing on the same side of said opening as said light emitting diode, together with reflector means situated on the opposite side of said opening for reflecting light from said diode back to said photodetector, said diode and reflector being situated so that the light path therebetween is along a path approximately parallel to, but offset from, a transverse diameter of said opening.

3. Apparatus according to claim 2 wherein said reflector means is configured to reflect said light beam back to said photodetector along a second path parallel to said first path and offset on the other side of said opening transverse diameter so that when a tubular transparent article is present in said opening, said beam will be glazingly reflected from two surfaces of said article.

4. Apparatus according to claim 3 wherein said reflector means comprises a porro prism.

5. Apparatus according to claim 3 wherein said reflector comprises a pair of mirrors mounted in said housing and situated at 45° with respect to each other and with respect to said diode and photodetector respectively.

6. Apparatus according to claim 3 wherein said opening is circular, and of slightly larger diameter than said article, wherein said diode, said reflector means, said photodetector and an amplifier for said photodetector all are mounted in said housing, said there being a tapered section adjacent said opening to aid the insertion of an article into said opening.

7. Apparatus according to claim 3 wherein there are narrow channels in said housing between said opening and said diode, said reflector means and said photodetector respectively for limiting and directing light along said spaced parallel paths.

8. Apparatus according to claim 7 wherein said article comprises a glass test tube, and wherein said parallel paths are situated so that light in each path will strike the glass surface of a test tube present in said opening at approximately the critical angle, so that maximum light deflection is achieved.

9. A detector for tubular transparent articles comprising;
an opaque housing,
a circular opening in said housing,
a light source in said housing and situated to project a beam of light along a first path parallel to but spaced from a diameter of said opening,
reflector means situated in said housing to reflect said light beam back along a second path parallel to said first path but spaced on the other side of said opening diameter, and
a photodetector situated in said housing to receive light from said second path,
said paths being spaced from said diameter by an amount so that the light beam intersects the curved surfaces of a tubular article present in said opening at approximately the critical angle at which total reflection occurs.

* * * * *